United States Patent [19]

Mott

[11] Patent Number: 4,491,165
[45] Date of Patent: Jan. 1, 1985

[54] TIRE PRESSES

[76] Inventor: Daniel B. Mott, 198 The Esplanade, Burleigh Heads, Queensland 4220, Australia

[21] Appl. No.: 420,517

[22] Filed: Sep. 20, 1982

[30] Foreign Application Priority Data

Nov. 6, 1981 [CA] Canada .................................. 389641

[51] Int. Cl.³ ............................................ B60C 25/06
[52] U.S. Cl. ........................................ 157/1.33; 157/1
[58] Field of Search ..................... 157/1, 1.1, 1.2, 1.33

[56] References Cited

U.S. PATENT DOCUMENTS

| | | | |
|---|---|---|---|
| 3,266,548 | 8/1966 | Kolosowsky | 157/1.33 |
| 3,807,478 | 4/1974 | Mott | 157/1.33 |
| 4,271,884 | 6/1981 | Udall et al. | 157/1 |

*Primary Examiner*—James G. Smith
*Attorney, Agent, or Firm*—Schwartz, Jeffery, Schwaab, Mack, Blumenthal & Koch

[57] ABSTRACT

A method of demounting a tire from a five-piece rim where, after the locking ring is removed, a number of bead seat breaker tools are mounted at spaced intervals around the rim and connected to the peripheral flange of the removable bead seat band to lock the latter to the rim. A central leg on each tool locks the tool to the rim. The top platen of the tire press is lowered to cause the bead flange to strip the tire bead from the removable bead seat band. The tools have respective hooks to engage the rim and sockets in the bead seat band.

3 Claims, 5 Drawing Figures

U.S. Patent  Jan. 1, 1985  4,491,165
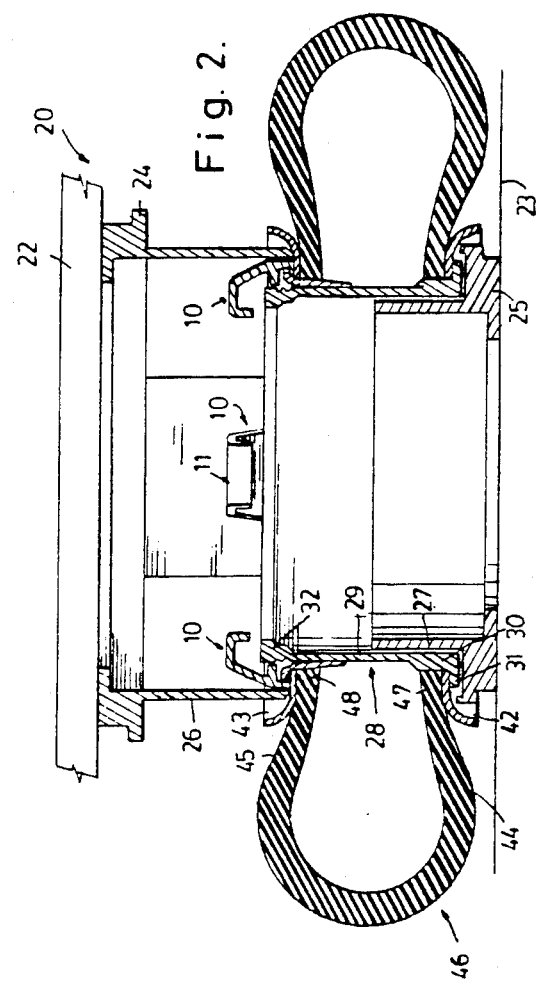
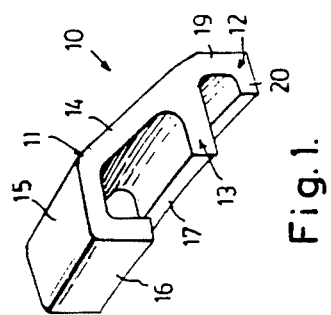

TIRE PRESSES

BACKGROUND OF THE INVENTION

1. Field of the Invention

This invention relates to tire presses and, in particular, to a method for removing the bead seat band from a wheel rim using such presses, and a bead seat breaker tool suitable for use in the method.

2. Related Prior Art

The bead seat breaker tool of the present invention may be used in conjunction with a tire press of the type disclosed in U.S. Pat. No. 3,807,478 issued to Daniel B. Mott.

3. Brief Description of the Prior Art

Tire fitters often encounter considerable difficulty when demounting the tires of large off-highway vehicles as the beads of the tires often "grow" onto the bead seat band.

A common method employed for releasing the tire bead from the bead seat band is as follows: the tire and rim assembly is placed in a tire press (e.g. of the type disclosed in the above U.S. patent) and the top platen of the tire press is lowered until the press tooling engages the bead flange on the rim. The platen is lowered to enable the locking ring and sealing ring (between the rim and the bead seat band) to be removed. The top platen of the press is then raised and the bead seat band/bead flange/tire bead combination is lifted above the rim. One or more bead seat breaker tools are clamped onto the rim, each tool having a flange which projects outwardly from the rim to be engaged by the nose of the bead seat band. The top platen is lowered and the bead seat band engages the breaker tools, preventing further downward movement of the bead seat band. The top platen is further lowered and the bead flange pushes the tire bead free of the bead seat band. The bead seat band is removed and the tire is demounted from the rim.

During the life of the wheel, the "nose" of the bead seat band becomes corroded and may become very thin. When the nose of the bead seat band is pressed down against the breaker tools, the weakened nose may be deformed outwardly, causing the tire bead to become snagged on the bead seat band and the nose of the bead seat band may cut into the bead area of the tire. This prevents the tire from being removed from the bead seat band. If the tire press continues to push downwardly on the bead flange, the bead area of the tire may be damaged as it is stripped free from the bead seat band and the tire is no longer usable (e.g. it cannot be retreaded and remounted on the rim).

BRIEF SUMMARY OF THE INVENTION

It is an object of the present invention to provide a method for releasing the tire bead from the bead seat band so that neither the tire bead or bead seat band are damaged.

It is a preferred object of the present invention to provide a method where the bead seat band is clamped onto the rim by one or more bead seat breaker tools hooked onto the rim and no force or load is applied on the nose of the bead seat band.

It is a further preferred object of the present invention to provide a method which eliminates the need for the bead seat band/bead flange/tire bead combination to be lifted above the rim before the bead seat breaker tools are fitted to the rim.

It is a still further preferred object to provide a simple bead seat breaker tool which is suitable for the method and which can be used with a number of different types of tire presses.

In one aspect the present invention resides in a method for demounting a tire from a rim assembly of the type including a rim having a fixed bead seat, a removable bead seat band having a peripheral flange, respective first and second bead flanges and a locking ring to releasably secure the bead seat band to the rim, said tire having first and second tire beads seated on the fixed bead seat and bead seat band respectively, the method including the steps of:

mounting the rim assembly with the tire mounted thereon in a tire press, the bottom platen of the press supporting the fixed bead seat;

lowering the top platen of the press to move the bead seat band out of engagement with the locking ring;

removing the locking ring from the rim;

mounting at least one bead seat breaker tool on the rim in engagement with the peripheral flange on the bead seat band to lock the bead seat band to the rim; and further lowering the top platen of the press to cause the second bead flange to strip the second tire bead from the bead seat band.

Preferably the first tire bead is released from the fixed seat band by engaging the rim with the top platen, engaging and supporting the first bead flange with the lower platen, and lowering the top platen to push the fixed bead seat downwardly causing the first bead flange to strip the first bead from the fixed bead seat.

Preferably a number of bead seat breaker tools are mounted on the rim at substantially equally spaced intervals, and the top platen engages the second bead flange adjacent the breaker tools.

Preferably each breaker tool has a first (rim) hook releasably connectable to the rim and a second (band) hook releasably connectable to the bead seat band.

Preferably the band hook engages in a respective socket provided at spaced intervals in the peripheral flange on the bead seat band.

Preferably each breaker tool includes a central leg which engages the rim to clamp the tool to the rim as the second tire bead is stripped from the bead seat band.

In a second aspect the present invention resides in a bead seat breaker tool for demounting a tire from a rim assembly of the type having a rim with a fixed bead seat, a removable bead seat band with a peripheral flange, respective first and second bead flanges and a locking ring releasably connecting the bead seat band to the rim, the breaker tool including:

a first hook releasably connectable to the rim; and a second hook releasably connectable to the peripheral flange on the bead seat band, the breaker tool being operable to lock the bead seat band to the rim as the top platen of a tire press is lowered to cause the second bead flange to strip a respective tire bead from the bead seat band.

Preferably the breaker tool includes a central leg which engages the rim to clamp the breaker tool to the rim as the tire bead is stripped from the bead seat band.

Preferably a small clearance is provided between the leg and the rim to enable the breaker tool to be fitted but, as the top platen is lowered, the breaker tool is deformed until the central leg engages the rim to clamp the tool to the rim.

Other preferred features of the present invention will become apparent to the skilled addressee from the following description.

BRIEF DESCRIPTION OF THE SEVERAL VIEWS OF THE DRAWINGS

To enable the invention to be fully understood, a preferred embodiment will now be described with reference to the accompanying drawings, in which:

FIG. 1 is a perspective view of one of the bead breaker tools;

FIG. 2 is a schematic sectional side view of the tire/rim combination in a tire press after the locking ring and sealing ring have been removed;

DETAILED DESCRIPTION OF A PREFERRED EMBODIMENT OF THE PRESENT INVENTION

Figure 5:
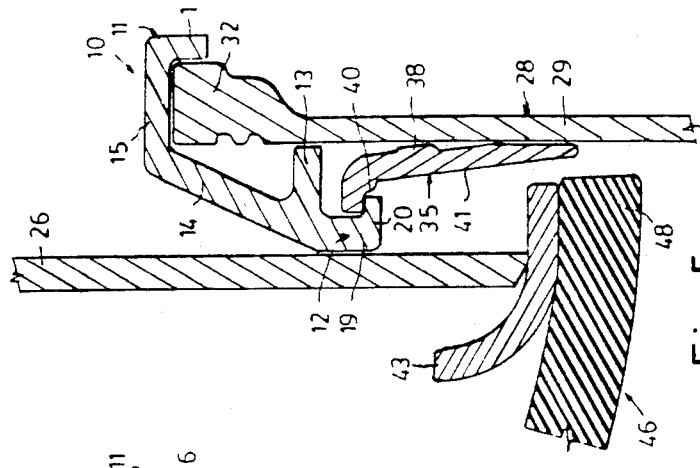
FIG. 5 is a view corresponding to FIG. 3 where the tire bead has been "broken" from the bead seat band.

Referring to FIG. 1, the bead seat breaker tool 10 (which is curved in plan view) has a rim hook 11 and a bead seat band hook 12 separated by a central leg 13 substantially intermediate of the tool. The web 14 of the rim hook is inclined at an acute angle to the central leg 13 and has a laterally extending flange 15 substantially parallel to the central leg. A return flange 16 is provided on the distal end of the flange 15 and is spaced outwardly from the edge face 17 of the central leg. The bond hook 12 has a web 19 substantially perpendicular to the central leg 13 and is provided with a flange 20 substantially parallel to, but not as wide as, the central leg.

Referring to FIG. 2, a tire press 21 has a top platen 22 movable relative to a bottom platen 23. Top and bottom tooling 24, 25 is mounted on the top and bottom platens 22, 23 respectively and each is provided with a number of curved top and bottom tool members 26, 27 respectively which can be moved to engage respective portions of a rim assembly 28.

The rim assembly 28 has an annular rim 29. A raised fixed bead seat 30 is provided circumferentially around one end of the rim and is provided with a fixed peripheral flange 31. The other end of the rim is of increased thickness and incorporates an integral circumferential reinforcing ring 32. Spaced circumferential grooves 33, 34 releasably receive a locking ring and a sealing ring (not shown) respectively.

A bead seat band 35 has an annular body 36 which is tapered towards its nose 37. A support flange 38 is provided on the inner face of the band to support the body 36 at an angle to the rim 29. A peripheral flange 39 extends outwardly from the side of the band spaced from the nose 37 and is provided with a number of sockets 40 provided at substantially equally spaced intervals around the flange. The divergent outer face of the band provides a bead seat 41.

Bead flanges 42, 43 are fitted to the rim assembly 28 in association with the fixed bead seat 30 and bead seat band 35 respectively and they support the lower portions of the side walls 44, 45 of the tire 46 adjacent its beads 47, 48 respectively.

The rim assembly 28 (and the mounted tire 46) are placed in the tire press with the rim 29 and fixed peripheral flange 31 seated on the bottom tooling 25 (the curved bottom tool members lying within the rim 29).

Figure 3:
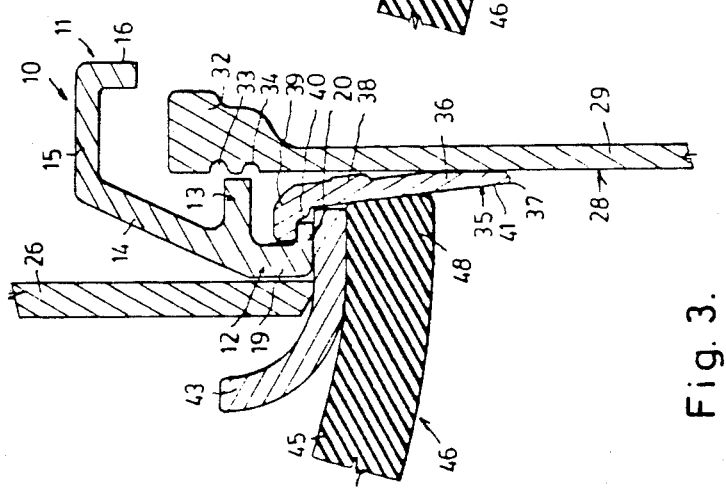
FIG. 3 is a sectional side view of a portion of FIG. 2 in more detail.

The top platen 22 is lowered until the top tool members 26 engage the bead flange 43. The platen 22 is lowered to push the bead seat band 35, bead flange 43 and tire side wall 45 downwardly (as shown in FIGS. 2 and 3) to enable the locking ring and sealing ring (not shown) to be removed. As the tire bead 48 has "grown" onto bead seat 41, the bead seat band 35 will be pulled down by the tire.

The top platen 22 is raised and four bead breaker tools 10 are connected to the rim assembly 28 (see FIG. 3). The flange 20 of each tool is engaged in a respective socket 40 in the bead seat band (the flanges being held in position by the adjacent bead flange 43). The tools are then positioned as shown in FIG. 3 and the top platen 22 is lowered until the top tool members 26 engage the bead flange 43. The tool members 26 are adjustably set on the top platen 22 so that a small clearance is provided between the tool members and the breaker tools to assist in retaining the latter in position.

Figure 4:
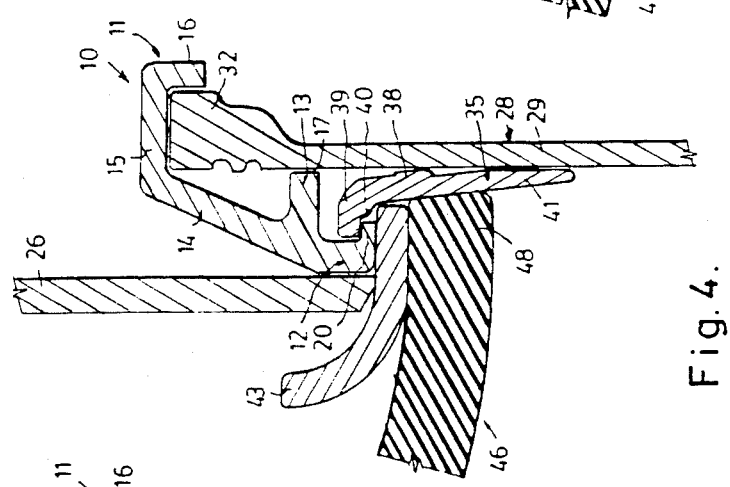
FIG. 4 is a view corresponding to FIG. 3 where the bead seat breaker tool has clamped the bead seat band to the rim.

Referring to FIG. 4, the top platen 22 is lowered until the rim hook 11 on the breaker tool engages the upper end of the rim 29. The bead seat band 35 is now locked to the rim 29 and cannot move any further. The top platen 22 is further lowered (see FIG. 5) and the bead flange 43 strips the tire bead 48 from the bead seat 41 on the bead seat band. (As no load is applied to the nose 37 of the bead seat band 35, it is not deformed outwardly and so cannot snag or damage the tire bead 48.).

As shown in FIG. 4, there is a small clearance between the rim 29 and the edge face 17 of the central leg 13 on the breaker tools. As the top platen 22 is lowered to the position in FIG. 5, the web 14 of the rim hook 11 is bent inwardly until the central leg 13 engages the rim 29 to both support the web 14 and to clamp the tool to the rim.

The top platen 22 is raised, the breaker tools 10 are removed from the rim 29, and the bead seat band 35 and bead flange 43 are lifted from the rim.

The bead 47 on the fixed bead seat 30 can then be removed in the known manner. The rim 29 (and the tire 46) is raised and the bottom tooling 25 is moved outwardly until the bottom tooling members 27 engage the bead flange 42. The top tooling 24 is moved inwardly until it is aligned with the upper face of the rim 29 (and the top tooling members 26 lie inside the rim).

The top platen 22 is lowered and the rim 29 is pushed downwardly through the tire 46, the bead flange 42 stripping the tire bead 47 from the fixed bead seat 30.

As the bead seat band 35 is supported by, and locked to the rim 29 by, the bead seat breaker tools 10, which engage the peripheral flange 39, no load is applied to the nose 37 of the band and, as discussed above, it is not deformed outwardly where it could "snag" or damage the tire bead 48. In addition, the use of the breaker tools of the present invention obviates the need to raise the bead seat band 35/bead flange 43/tire bead 48 above the rim to enable the fitting of the conventional breaker tools to the rim.

The particular size and shape of the breaker tools, and the number of tools used, will be dependent on the arrangement of the rim assembly 28.

Various changes and modifications may be made to the embodiment described and illustrated without departing from the scope of the present invention defined in the appended claims.

I claim:

1. A bead seat breaker tool for demounting a tire from a rim assembly having a rim with a fixed bead seat, a removable bead seat band with a peripheral flange, and first and second bead flanges, said breaker tool comprising:
   (a) a first hook end of generally inverted U-shape releasably connectable to the rim during demounting,
   (b) a relatively short second hook end extending in the direction of said first hook end and laterally offset from said first hook end, said second hook end being adapted to releasably engage and retain the peripheral flange of the bead seat band during demounting,
   (c) a central leg located between said first and second hook ends, said central leg also extending in the direction of said first hook end and being relatively short and having a free end laterally offset from that portion of the first hook end engaging said rim during demounting, and
   (d) a resiliently deformable web interconnecting said first hook end and said central leg,
      the free end of said central leg during the initial step of demounting being spaced slightly from said rim to provide a small clearance with the rim, the continuation of the demounting process resulting in the stripping of the tire bead from the bead seat band and the deformation of said web whereby said free end of said central leg engages the rim to clamp the breaker tool to the rim.

2. A breaker tool as claimed in claim 1 wherein the second hook is releasably engageable in a socket in the peripheral flange of the bead seat band, a plurality of the sockets being provided at substantially equally spaced intervals around the peripheral flange.

3. A breaker tool as claimed in claim 1 wherein during the demounting process said second hook end effects locking of said removable bead seat band to said rim, such locking removing loading on the lower end of said removable bead seat band so as to preclude outward deformation on such lower end which would otherwise cause snagging of an adjacently disposed tire bead.

* * * * *